3,177,232
METAL CHELATES OF 1-AMINO-7-IMINO-1,3,5-CYCLOHEPTATRIENES
Earl L. Muetterties, West Chester, Pa., assignor to E. I. du Pont de Nemours and Company, Wilmington, Del., a corporation of Delaware
No Drawing. Filed July 1, 1963, Ser. No. 292,088
6 Claims. (Cl. 260—429.7)

This invention relates to certain new metal chelates.

The chelates of 1-amino-7-imino-1,3,5-cycloheptatrienes with certain metals have been described in U.S. Patent 3,052,705 to Brasen and Howard. All of the chelates disclosed in this patent are non-ionic in character, i.e., they are inherently complexes in which the number of ligand molecules and negative ions, if any, bound to the metal atom is such that all of the primary (ionic) valences of the metal are satisfied within its coordination sphere and that the complex retains no ionic charge, either positive or negative. These chelates are therefore neutral species and they are substantially insoluble in water.

It has now been found that the 1-amino-7-imino-1,3,5-cycloheptatrienes are capable of forming with certain specific elements positively charged chelates which are isolated as salts characterized by solubility in water and resistance to alkaline hydrolysis.

The new products of this invention are metal complexes of the general formula

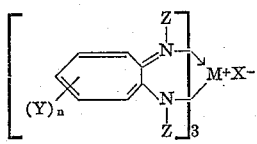

where M is an element of Group IV–A of the Periodic Table having atomic number from 14 to 50, inclusive (i.e., silicon, germanium or tin); X is an anion; Y is a nuclear substituent such as the chloro, bromo or sulfo radical; $n$ is a whole number from 0 to 2, inclusive; and Z is hydrogen, an aliphatically saturated hydrocarbon radical of 1 to 10 carbons or such a radical bearing halo, nitro, sulfo, lower alkoxy and lower dialkylamino substituents.

The Periodic Table referred to herein is the table appearing in Deming's "General Chemistry," John Wiley and Sons, Inc., 5th ed., Chap. 11.

These compounds are prepared by a one- or two-step process which comprises:

(a) Bringing in contact in an aprotic organic solvent a metal tetrahalide M(Hal.)$_4$, where M is silicon, germanium or tin and Hal. stands for chlorine or bromine, with a 1-amino-7-imino-1,3,5-cycloheptatriene having hydrogen on the amino nitrogen, whereby there is spontaneous formation of an ionic chelate in which the anion is Cl$^-$ or Br$^-$, as the case may be, according to the equation

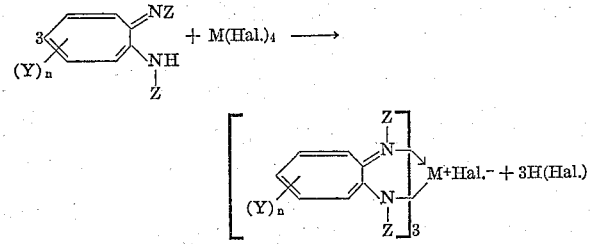

where Y, $n$ and Z have the previously stated significance; and, (b) If a different chelate salt is desired, bringing in contact in aqueous solution the above chloride or bromide chelate with a salt of a strong base and an acid whose anion is other than chloride or bromide, whereby metathesis occurs to give a chelate of the same structure but where the chloride or bromide anion is replaced by the new anion.

In the first step of this process, there can be used as the ligand-forming reactant any of the 1-amino-7-imino, 1,3,5-cycloheptatrienes corresponding to the formula shown in the above equation, such as those described in U.S. Patent 3,052,705 already referred to or in U.S. Patent 3,068,272 to Holmquist. These starting materials include those in which Z in the above formula is hydrogen; an aliphatically saturated hydrocarbon radical of 1 to 10 carbon atoms, for example alkyl such as methyl, ethyl, propyl, n-butyl, n-octyl, n-decyl; cycloalkyl such as cyclohexyl; aryl such as phenyl, naphthyl; aralkyl such as benzyl, phenylethyl; alkaryl such as tolyl, xylyl; and the substituted derivatives thereof, particularly such hydrocarbon radicals having a lower alkoxy, lower dialkylamino, nitro, halo or sulfo substituent, for example p-methoxyphenyl, ethoxyethyl, p-dimethylaminophenyl, diethylaminoethyl, p-nitrophenyl, p-chlorophenyl, o-fluorophenyl, p-sulfophenyl and the like. The nuclear substituent Y in the above formula, if present, may be chloro, bromo, or sulfo. The preferred starting materials, for reasons of accessibility and cost, are the ring-unsubstituted ones ($n=0$ in the above formula) in which the groups attached to the nitrogen atoms are hydrogen, lower alkyl, phenyl or substituted phenyl.

The relative proportions of the metal tetrahalide and the 1-amino-7-imino-1,3,5-cycloheptatriene are not critical, since a complex containing three ligand molecules per atom of metal forms regardless of the initial reactant ratio. However, for more complete utilization of the reactants and easier recovery of the reaction products, it is preferred to use approximately three moles of 1-amino-7-imino-1,3,5-cycloheptatriene per mole of metal tetrachloride or tetrabromide.

In view of the sensitivity to water, hydroxylated compounds or protonic compounds in general of the silicon, germanium and tin tetrahalides, the chelate-forming reaction is conducted in an aprotic liquid medium which dissolves the reactants to at least some extent, e.g., 5% by weight. An aprotic solvent, as defined in Remick's "Electronic Interpretations of Organic Chemistry" (1943), pages 456–457, is one which neither gives up nor takes up protons to an appreciable degree. The suitable solvents may also be defined as those in which any hydrogen atoms present are bound solely to carbon atoms. Preferred solvents include aromatic hydrocarbons, such as benzene, toluene, the xylenes, chlorobenzene; aliphatic halohydrocarbons such as methylene chloride, chloroform, trichloroethylene, tetrachloroethylene, sym.-tetrachlorodifluoroethane; nitriles such as acetonitrile; ethers such as di-n-butyl ether, dioxane, tetrahydrofuran, etc. An acid acceptor to neutralize the hydrogen halide formed, such as a tertiary amine, e.g., pyridine, triethylamine, may be present but this is by no means essential.

The chelate-forming reaction is spontaneous and exothermic. Thus, application of heat is not necessary, although mild heating to complete the reaction and expel the hydrogen halide can be used if desired. There is therefore no critical reaction temperature, and the external temperature may be, for example, in the range of −20° C. to 100° C.

The resulting ionic chelate often precipitates from the solution as it forms. If this does not take place, it can be isolated by evaporation of the solvent. These chelates are crystalline solid which may be purified, if necessary, by recrystallization from water or from mixtures of water and miscible organic solvents such as methanol, ethanol, acetone or acetonitrile.

From these initially obtained chelate salts, in which the anion is Cl$^-$ or Br$^-$, other chelate salts containing any desired anion can be prepared by simple methathesis in an aqueous medium. The term "anion" refers, of course, to that charged atom or group which, when combined with protonic hydrogen, forms a compound which, in aqueous solution, has a pH not higher than that of water.

This methathetical reaction is most conveniently effected simply by bringing in contact in a preponderantly aqueous solution (water alone or mixtures of water with an ionizing, water-soluble organic solvent such as a lower alkanol) the chelate obtained in the initial step of the process and at least an equimolar amount of a salt of a strong base (dissociation constant of at least $1 \times 10^{-5}$) and the acid whose anion is desired. The cation in this salt may be, for example, an alkali metal (preferably sodium or potassium), ammonium, or alkylammonium such as tetramethylammonium, tetraethylammonium, dimethylammonium, isopropylammonium, tributylammonium, etc. The nature of the anion is immaterial. It can be inorganic or organic, monovalent or polyvalent. Thus, for example, the anion may be iodide, fluoride, cyanide, hydroxy, nitrate, nitrite, sulfate, sulfite, chlorate, phosphate, monohydrogen phosphate, carbonate, sulfide, chromate, borohydride, acetate, trichloroacetate, trifluoroacetate, butyrate, acrylate, methacrylate, crotonate, dodecanoate, stearate, cyclohexanoate, benzoate, toluate, picrate, benzenesulfonate, fluorobenzoate, benzenephosphonate, benzenearsenate, anthranilate, glycinate, etc. It may also be a complex anion such as tetrathiocyanatodiammino chromate or ferricyanide. Further, it may be the anion formed by a strong pi acid reducible to an anion-radical, such as tetracyanoquinodimethane. The preferred anions are the monovalent inorganic anions and the monovalent organic anions containing from 1 to 12 carbon atoms.

This reaction takes place at temperatures as low as 0° C. or even lower. It can be accelerated by warming the aqueous solution but it is in general unnecessary to exceed a temperature of about 100° C.

The separation of the resulting ionic chelate is based on the solubility differences between it and the salt formed concomitantly. With proper selection of the cation and anion in the non-chelate reactant, a solubility differential will always exist. In the majority of cases, the salt formed is more soluble in water than the chealate formed and the latter precipitates, if necessary after concentration of the solution. Less frequently, the salt will precipitate first, or may be caused to do so by addition of a water-miscible organic solvent such as methanol, ethanol or acetone. Selective solubility in an appropriate organic solvent may also be employed to effect or complete the separation.

This metathetical reaction can also be applied to chelates having anions other than Cl⁻ or Br⁻, after such chelates have been prepared as described above, so that it is possible, if desired, to exchange anions at will.

A variation of the anion exchange reaction involves the use of the well-known ion exchange resins. This procedure is valuable for the preparation of highly water-soluble chelates, and it can also be used to exchange anions other than Cl⁻ or Br⁻. For example, a solution of a chelate $L_3M^+X^-$ (L representing the 1-amino-7-imino-1,3,5-cycloheptatriene ligand) in water or an ionizing solvent such as a lower alkanol can be passed through a column containing the hydroxy ion form of an ion exchange resin to yield a solution of the $L_3M^+OH^-$ chelate. Addition to this solution of an equivalent amount of a salt of a volatile base, e.g., $NH_4^+X^-$ or $(CH_3)_3NH^+X^-$ or of an acid $H^+X^-$, where $X^-$ is the anion to be introduced, followed by evaporation to dryness, will yield the desired chelate $L_3M^+X^-$. As another example, a solution of a chelate $L_3M^+X^-$ can be passed through a column containing the sulfonic, carboxylic or chloride form of an ion exchange resin, with resultant anion exchange.

The ionic chelates of 1-amino-7-imino-1,3,5-cycloheptatrienes with silicon, germanium and tin are yellow to orange colored crystalline solids. They are characterized by extraordinary stability toward hydrolytic agents. No decomposition occurs when these compounds are treated with boiling water or boiling dilute alkalies, even on prolonged contact. These chelates are also highly stable to atmospheric conditions. This behavior is remarkable and unexpected since ionic chelates of these elements with other ligands such as actylacetone are known to be rapidly decomposed by water and atmospheric moisture.

The following examples illustrate the invention.

*Example I*

A solution of 1.7 g. (0.01 mole) of silicon tetrachloride and 3 g. (0.03 mole) of triethylamine in 40 ml. of chloroform was added to a solution of 5 g. (0.033 mole) of 1-methylamino-7-methylimino-1,3,5-cycloheptatriene in 40 ml. of dichloromethane. Heat was evolved and a yellow precipitate of tris(1-methylamino-7-methylimino-1,3,5-cycloheptatrieno)silicon chloride separated.

The chelate was collected by filtration and dissolved in a water-methanol mixture. To this solution was addd a saturated aqueous solution of ammonium hexafluorophosphate. There was immediate precipitation of the tris(1-methylamino - 7 - methylimino - 1,3,5 - cycloheptatrieno)silicon hexafluorophosphate. After recrystallization from a hot water-methanol-acetonitrile mixture, this chelate was obtained as yellow crystals, M.P. 269° C.

*Analysis.*—Calcd. for $(C_9H_{11}N_2)_3Si^+PF_6^-$: C, 52.8; H, 5.4; P, 5.1; Si, 4.6. Found: C, 52.7; H, 5.1; P, 5.4; Si, 4.9.

The chelate underwent no decomposition in hot 5% sodium hydroxide solution, as shown by the fact that the ultraviolet spectrum of the solution did not show any of the characteristic absorptions of the initial ligand material, 1-methylamino-7-methylimino-1,3,5-cycloheptatriene.

*Example II*

A solution of tris(1-methylamino-7-methylimino-1,3,5-cycloheptatrieno)silicon chloride in water-methanol was treated with a saturated aqueous solution of sodium iodide. A yellow-brown precipitate of tris(1-methylamino-7-methylimino - 1,3,5 - cycloheptatrieno)silicon iodide separated and was collected by filtration. This chelate does not melt below 300° C. Infrared analysis supported the assigned structure.

*Example III*

A solution of 5 g. (0.03 mole) of 1-methylamino-7-methylimino-1,3,5-cycloheptatriene in 40 ml. of dichloromethane was added to a solution of 4 g. (0.01 mole) of germanium tetrabromide and 3 g. (0.03 mole) of triethylamine in 40 ml. of dichloromethane. Heat was evolved and the reaction mixture became a slurry. Evaporation of the solvent gave a yellow solid residue which was extracted with ether and recrystallized from a chloroform-benzene mixture to yield tris(1-methylamino-7-methylimino-1,3,5-cycloheptatrieno)germanium bromide.

This chelate was dissolved in a water-methanol mixture and a saturated aqueous solution of ammonium hexafluorophosphate was added to the solution. The resulting yellow precipitate of tris(1-methylamino-7-methylimino-1,3,5 - cycloheptatrieno)germanium hexafluorophosphate was collected by filtration. It melted at 291–294° C., after recrystallization from a hot water-methanol-acetonitrile mixture.

*Analysis.*—Calcd. for $(C_9H_{11}N_2)_3Ge^+PF_6^-$: C, 49.2; H, 5.0; Ge, 11.0; P, 4.7. Found: C, 48.1; H, 5.0; Ge, 10.9; P, 5.0.

The germanium chelate showed the same stability toward hydrolysis as the silicon chelate.

*Example IV*

Following essentially the procedure of Example III, but using tin tetrabromide, tris(1-methylamino-7-methylimino-1,3,5-cycloheptatrieno)tin bromide was prepared, then reacted with ammonium hexafluorophosphate.

The resulting tris(1-methylamino-7-methylimino-1,3,5-cycloheptatrieno)tin hexafluorophosphate melted at 253–258° C., after recrystallization from hot water.

*Analysis.*—Calcd. for $(C_9H_{11}N_2)_3Sn^+PF_6^-$: Sn, 16.9; P, 5.5. Found: Sn, 17.4; P, 5.0.

This chelate showed the same resistance to hydrolysis as the silicon and germanium chelates.

The foregoing examples are to be considered as illustrative rather than limitative, since the described procedures are broadly applicable to the preparation, from any 1-amino-7-imino-1,3,5-cycloheptatriene, of ionic chelates of silicon, germanium and tin, the anion being any desired one and the chelates having the previously set forth general structure.

Additional examples of chelates obtainable by the described process are shown in the following list, in which the first column names the ligand-forming compound; the second column indicates the element by its symbol, and the third column gives the formula of the anion.

| Ligand-forming Compound | Metal | Anion |
| --- | --- | --- |
| 1-Amino-7-imino-1,3,5-cycloheptatriene | Si | $F^-$ |
| 1-Phenylamino-7-phenylimino-1,3,5-cycloheptatriene. | Si | $NO_3^-$ |
| 1-Ethylamino-7-ethylimino-1,3,5-cycloheptatriene. | Si | $CN^-$ |
| 1-Cyclohexylamino-7-cyclohexylimino-1,3,5-cycloheptatriene. | Si | $CF_3COO^-$ |
| 1-(2-Methoxyethylamino)-7-(2-methoxyethylimino)-1,3,5-cycloheptatriene. | Si | $PO_4^\equiv$ |
| 1-Propylamino-7-propylimino-1,3,5-cycloheptatriene, ring dichlorinated. | Si | $CH_3C_6H_4COO^-$ |
| 1-(p-Dimethylaminophenylamino)-7-(p-dimethylaminophenylimino)-1,3,5-cycloheptatriene. | Si | $C_6H_5SO_3^-$ |
| 1-(n-Decylamino)-7-(n-desylimino)-1,3,5-cycloheptatriene. | Si | $BH_4^-$ |
| 1-(2,5-Dimethylphenylamino)-7-(2,5-dimethylphenylimino)-1,3,5-cycloheptatriene. | Si | $C_6H_5COO^-$ |
| 1-Amino-7-imino-1,3,5-cycloheptatriene | Ge | $CH_3(CH_2)_{16}COO^-$ |
| 1-Benzylamino-7-benzylimino-1,3,5-cycloheptatriene. | Ge | $SH^-$ |
| 1-Naphthylamino-7-naphthylimino-1,3,5-cycloheptatriene. | Ge | $CH_3(CH_2)_2COO^-$ |
| 1-(p-Chlorophenylamino)-7-(p-chlorophenylimino-1,3,5-cycloheptatriene, ring monosulfonated. | Ge | $SO_4^-$ |
| 1-(p-Methoxyphenylamino)-7-(p-methoxyphenylimino)-1,3,5-cycloheptatriene. | Ge | $CrO_4^-$ |
| 1-(n-Butylamino)-7-(n-butylimino)-1,3,5-cycloheptatriene, ring monobrominated. | Ge | $Cr(SCN)_4(NH_3)_2$ |
| 1-(p-Sulfophenylamino)-7-(p-sulfophenylimino)-1,3,5-cycloheptatriene. | Ge | $CCl_3COO^-$ |
| 1-Amino-7-imino-1,3,5-cycloheptatriene | Sn | $CH_3(CH_2)_{10}COO^-$ |
| 1-(p-Nitrophenylamino)-7-(p-nitrophenylimino)-1,3,5-cycloheptatriene. | Sn | $SO_3^-$ |
| 1-(Butoxymethylamino-7-(butoxymethylimino)-1,3,5-cycloheptatriene. | Sn | $CH_3COO^-$ |
| 1-Amino-7-imino-1,3,5-cycloheptatriene, ring dibrominated. | Sn | $F-C_6H_4COO^-$ |
| 1-(2-Methylphenylamino)-7-(2-methylphenylimino)-1,3,5-cycloheptatriene. | Sn | $NO_2^-$ |
| 1-Cyclopentylamino-7-cyclopentylimino-1,3,5-cycloheptatriene. | Sn | $CO_3^-$ |
| 1-(3,5-Dibromophenylamino)-7-(3,5-dibromophenylimino)-1,3,5-cycloheptatriene. | Sn | $ClO_4^-$ |

The preferred compounds of this invention are those ionic chelates in which the anion is $Cl^-$ or $Br^-$, since they are obtained directly from the corresponding metal tetrahalide and are the precursors of the other ionic chelates.

By virtue of the fact that the described chelates are all colored, they are generically useful as water-soluble dyes. Their high stability toward hydrolysis and oxidation makes them useful in particular as dyes for antifreeze compositions used in the cooling system of internal combustion engines, and as dye markers for use in water or on snow or ice.

The products of this invention are further generically useful as test reagents for ink eradicators, by virtue of the fact that they give a color test when in contact with the oxidizing agents present in these materials. This property was shown as follows: Strips of paper were impregnated with a dilute aqueous/methanol solution of tris(1-methylamino-7-methylimino-1,3,5-cycloheptatrieno)silicon hexafluorophosphate, and allowed to dry. Upon touching the paper with representative ink removing materials, viz., dilute aqueous potassium permanganate, dilute aqueous sodium hypochlorite, and a commercial ink eradicator, colored spots appeared at the points of contact (dark brown, whitish yellow brown and yellow brown, respectively). The other chelates of this invention give similar color tests. This property makes the products of this invention useful for the detection or prevention of forgery or alterations by erasure in such written documents as bank checks, ledgers, wills, letters, notebooks and the like. The inherent color of the chelates is not a disadvantage in this use since many business records such as checks or invoices are often themselves produced in color.

Additionally, the ionic chelates of this invention in which the anion is small and/or forms readily soluble salts, e.g., $Cl^-$, $Br^-$, are useful as scavengers or sequestering agents for large anions, such as $Fe(CN)_6^\equiv$, $AsF_6^-$, $SbF_6^-$, etc., since they remove such anions from solutions containing them through the described anion exchange reaction.

As many widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A metal chelate of the formula

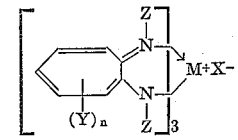

wherein M is an element of Group IV–A of the periodic table having an atomic number from 14 to 50 inclusive, X is an anion, Y is a nuclear substituent selected from the group consisting of halo of atomic number 17 to 35 inclusive and sulfo, Z is selected from the group consisting of hydrogen and $C_1$–$C_{10}$ aliphatically saturated hydrocarbon radicals having as any substituent thereon a member of the group consisting of halo, nitro, sulfo, lower alkoxy and lower dialkylamino and $n$ is a whole number from 0 to 2 inclusive.

2. A compound defined in claim 1 wherein X is an inorganic anion, Z is an unsubstituted $C_1$–$C_{10}$ aliphatically saturated hydrocarbon radical and $n$ is zero.

3. A compound defined in claim 1 wherein X represents halide, Z is lower alkyl and $n$ is zero.

4. Tris(1-methylamino-7-methylimino-1,3,5-cycloheptatrieno)silicon chloride.

5. Tris(1-methylamino-7-methylimino-1,3,5-cycloheptatrieno)germanium hexafluorophosphate.

6. Tris(1-methylamino-7-methylimino-1,3,5-cycloheptatrieno)tin bromide.

References Cited by the Examiner

UNITED STATES PATENTS 3,052,705   9/62   Brasen _____ 260—429

OTHER REFERENCES

Muetterties: J.A.C.S., vol. 82, pp. 1082–1087, March 5, 1960.

TOBIAS E. LEVOW, *Primary Examiner.*